US010146527B2

(12) United States Patent
Olarig et al.

(10) Patent No.: US 10,146,527 B2
(45) Date of Patent: Dec. 4, 2018

(54) METHOD AND APPARATUS FOR USING BMC AS PROXY FOR NVME OVER FABRICS DEVICE FIRMWARE UPGRADE

(71) Applicant: Samsung Electronics Co., Ltd., Suwon-si, Gyeonggi-do (KR)

(72) Inventors: Sompong Paul Olarig, Pleasanton, CA (US); Son Pham, San Ramon, CA (US); Fred Worley, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 37 days.

(21) Appl. No.: 15/376,263

(22) Filed: Dec. 12, 2016

(65) Prior Publication Data

US 2018/0101376 A1   Apr. 12, 2018

Related U.S. Application Data

(60) Provisional application No. 62/407,159, filed on Oct. 12, 2016.

(51) Int. Cl.
| | |
|---|---|
| *G06F 9/44* | (2018.01) |
| *G06F 8/65* | (2018.01) |
| *H04L 12/24* | (2006.01) |
| *G06F 8/61* | (2018.01) |
| *G06F 8/654* | (2018.01) |

(52) U.S. Cl.
CPC ............ *G06F 8/65* (2013.01); *G06F 8/63* (2013.01); *G06F 8/654* (2018.02); *H04L 41/082* (2013.01)

(58) Field of Classification Search
None
See application file for complete search history.

(56) References Cited

U.S. PATENT DOCUMENTS

| | | | |
|---|---|---|---|
| 7,484,084 B1 | 1/2009 | Ranaweera et al. | |
| 7,809,836 B2 | 10/2010 | Mihm et al. | |
| 8,793,481 B2 * | 7/2014 | Darling | G06F 9/5077 713/100 |
| 8,856,772 B2 | 10/2014 | Fan | |
| 8,875,154 B2 * | 10/2014 | Bhatia | G06F 9/546 709/223 |
| 9,025,495 B1 | 5/2015 | Brown et al. | |
| 9,110,843 B2 | 8/2015 | Chiu et al. | |
| 9,183,395 B2 | 11/2015 | Liles et al. | |
| 9,208,047 B2 | 12/2015 | McGraw | |
| 9,916,270 B2 * | 3/2018 | Richardson | G06F 13/362 |
| 2009/0006834 A1 * | 1/2009 | Rothman | G06F 8/65 713/2 |
| 2010/0228960 A1 | 9/2010 | Huang et al. | |
| 2013/0290947 A1 | 10/2013 | Li et al. | |
| 2014/0101653 A1 * | 4/2014 | Dharmadhikari | G06F 8/65 717/173 |
| 2015/0149750 A1 | 5/2015 | Maity et al. | |
| 2016/0188313 A1 | 6/2016 | Dubal et al. | |
| 2016/0283221 A1 * | 9/2016 | Kochar | G06F 9/45558 |
| 2017/0315798 A1 * | 11/2017 | Shivanna | G06F 8/654 |

* cited by examiner

*Primary Examiner* — Philip Wang
(74) *Attorney, Agent, or Firm* — Innovation Counsel LLP (57) ABSTRACT

A method for upgrading a firmware of a target device includes: receiving a firmware upgrade request from an initiator, the firmware upgrade request including a target identification and a firmware image; authenticating the firmware upgrade request using a baseboard management controller (BMC) of a switching board; and performing the firmware upgrade of the target device using the BMC of the switching board.

21 Claims, 6 Drawing Sheets

METHOD AND APPARATUS FOR USING BMC AS PROXY FOR NVME OVER FABRICS DEVICE FIRMWARE UPGRADE

CROSS-REFERENCE TO RELATED APPLICATION(S)

This application claims the benefits of and priority to U.S. Provisional Patent Application Ser. No. 62/407,159 filed Oct. 12, 2016, the disclosure of which is incorporated herein by reference in its entirety.

TECHNICAL FIELD

The present disclosure relates generally to network switches, and more particularly, to a system and method for upgrading a firmware of a non-volatile memory express over fabrics (NVMeoF) device using a baseboard management controller (BMC).

BACKGROUND

A firmware of a solid-state drive (SSD) is typically upgraded (or updated) by host software through a device driver of the SSD running on a host computer. If a new SSD is inserted into an enclosure of a server (or a switch) or a new SSD firmware is available, the host software checks the version of the current SSD firmware and, if necessary, performs an upgrade of the SSD firmware to replace the current SSD firmware.

Non-volatile memory (NVM) express over fabrics (NVMeoF) defines a common architecture that supports a NVM express (NVMe) block storage protocol over a wide range of storage networking fabrics such as Ethernet, Fibre Channel, InfiniBand, and other network fabrics. For an NVMeoF-based system, an X86-based central processing unit (CPU) on a motherboard is no longer required to move data between an initiator (e.g., host software) and a target device (i.e., an NVMeoF device) because the target device is capable of moving data by itself. To minimize the system cost while improving security, a less expensive embedded switch CPU may be used to perform control plane functions inside the enclosure of the NVMeoF-based system. As such, there is no direct communication between the switch CPU for the control plane and NVMeoF devices (e.g., Ethernet SSDs or eSSDs) for the data plane within the NVMeoF-based system.

A baseboard management controller (BMC) is a low-power controller embedded in a server (or a switch) and used to monitor various operating conditions of the chassis and control peripheral devices. For example, the BMC connects to one or more chassis sensors, reads environmental and operating conditions from the chassis sensors, and can control the attached NVMeoF devices through a local bus such as a peripheral component interconnect express (PCIe) interface and/or a universal serial bus (USB).

Typically, a system is required to undergo a significant downtime to upgrade the SSD firmware for the attached SSDs. The system downtime may be incrementally increased as the number of attached SSDs increases. The system downtime may be further prolonged when the SSD firmware upgrade is performed across a low-speed bus such as an NVMe management interface bus. Further, an SSD firmware upgrade over a data plane of the Ethernet is not desirable because data transferred over the Ethernet is on a data-plane that can be easily compromised.

SUMMARY

According to one embodiment, a method for upgrading a firmware of a target device includes: receiving a firmware upgrade request from an initiator, the firmware upgrade request including a target identification and a firmware image; authenticating the firmware upgrade request using a baseboard management controller (BMC) of a switching board; and performing the firmware upgrade of the target device using the BMC of the switching board.

According to another embodiment, a switchboard includes: a plurality of slots configured to connect a plurality of devices; a network controller; and a baseboard management controller (BMC) connected to each of the plurality of slots. The BMC controller is configured to receive a firmware upgrade request from an initiator via the network controller, the firmware upgrade request including a target identification and a firmware image. The BMC is further configured to authenticate the firmware upgrade request and perform the firmware upgrade of one or more target devices.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of the present disclosure.

BRIEF DESCRIPTION OF THE DRAWINGS

The accompanying drawings, which are included as part of the present specification, illustrate the presently preferred embodiment and together with the general description given above and the detailed description of the preferred embodiment given below serve to explain and teach the principles described herein.

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims.

DETAILED DESCRIPTION

Each of the features and teachings disclosed herein can be utilized separately or in conjunction with other features and teachings to for upgrading a firmware of one or more target devices. Representative examples utilizing many of these additional features and teachings, both separately and in combination, are described in further detail with reference to the attached figures. This detailed description is merely intended to teach a person of skill in the art further details for practicing aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

In the description below, for purposes of explanation only, specific nomenclature is set forth to provide a thorough understanding of the present disclosure. However, it will be apparent to one skilled in the art that these specific details are not required to practice the teachings of the present disclosure.

Some portions of the detailed descriptions herein are presented in terms of algorithms and symbolic representations of operations on data bits within a computer memory. These algorithmic descriptions and representations are used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms presented herein are not inherently related to any particular computer or other apparatus. Various general-purpose systems, computer servers, or personal computers may be used with programs in accordance with the teachings herein, or it may prove convenient to construct a more specialized apparatus to perform the required method steps. The required structure for a variety of these systems will appear from the description below. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of an original disclosure, as well as for the purpose of restricting the claimed subject matter. It is also expressly noted that the dimensions and the shapes of the components shown in the figures are designed to help to understand how the present teachings are practiced, but not intended to limit the dimensions and the shapes shown in the examples.

The present disclosure describes a system and method for performing a firmware upgrade (or update) of one or more target devices using a baseboard management controller (BMC). Herein, a target device and an NVMeoF device may be interchangeably used without deviating from the scope of the present disclosure. The NVMeoF device may be herein also referred to as an Ethernet SSD or an eSSD. However, it is noted that the NVMeoF device disclosed herein is not limited to an Ethernet SSD, and any other types of NVMeoF devices can be used without deviating from the scope of the present disclosure. In some embodiments, the Ethernet SSD may be used in the same context as a fabric-attached SSD. For example, a fabric-attached SSD may include InfiniBand, Fibre-Channel, Ethernet etc. as an interface. The BMC may be embedded in an internal switch board within an enclosure of a server or a network switch, or a storage bay. The server or the network switch can have one or more racks, and one or more NVMeoF devices can be inserted into a drive bay of each of the racks.

The BMC of the switch board has an access to the one or more attached NVMeoF devices and has relevant status information for the attached NVMeoF devices. Therefore, the BMC can access and control the attached NVMeoF devices through one or more system buses, for example, an NVMe management interface bus, a universal serial bus (USB) bus, a PCIe bus, or via an Ethernet switch. For example, the BMC can receive various commands from a host, either local or remote, and execute the received commands via an out-of-band control plane via the NVMe management interface bus. Examples of such commands operable over NVMe management interface bus include, but are not limited to, discovering, monitoring, and upgrading a firmware upgrade on the attached NVMeoF devices. In one embodiment, an initiator or a system administration server sends a firmware upgrade request to the BMC using an intelligent platform management interface (IPMI) command. The firmware upgrade request issued by the initiator may instruct the BMC to download a new firmware image. The BMC can download the new firmware image to one or more target NVMeoF devices via a PCIe bus or an Ethernet switch. After the firmware image is downloaded to the target NVMeoF device(s), the initiator or the system administration server sends another IPMI command to commit the firmware upgrade. The BMC validates the firmware image downloaded to the target NVMeoF device(s) and performs a reset of the NVMeoF device(s) to activate the new firmware.

According to one embodiment, the present system and method for performing a firmware upgrade (or update) of one or more target NVMeoF devices uses a high-speed bus such as a USB, a serial peripheral interface (SPI) bus, and a peripheral component interconnect express (PCIe) bus. For example, the present system and method uses a PCIe 1x bus that is typically used for graphics. The PCIe switch can support the high-speed PCIe 1x bus (e.g., 500 MB/s with PCIe 1x 2.0) to update the firmware of the attached NVMeoF devices.

The present system and method allows the download of a firmware image via a control plane as opposed to a data plane as defined by the NVMeoF standard. According to one embodiment, the present system and method allows programming each of the attached NVMeoF devices with their static IP addresses. The standard NVMe protocol does not have to deal with the IP address of the NVMeoF devices and can allow the IP configuration locally.

Each NVMeoF device may be preprogrammed with a bogus static IP address at the factory. During the deployment, a user may want to configure the NVMeoF devices with their preferred static IP addresses. The present system and method enables the user to configure the NVMeoF devices with their own static IP addresses either via a control plane or a data plane. To achieve this, the BMC can function as a proxy to program and upgrade the NVMeoF devices as the user desires. For example, the present system and method for performing a firmware upgrade of an NVMeoF device may be applied to datacenter applications where a large volume of NVMeoF devices is attached to a server (or a switch) and there is a need for programming or configuring the large volume of NVMeoF devices in an efficient yet secure manner.

Figure 1:
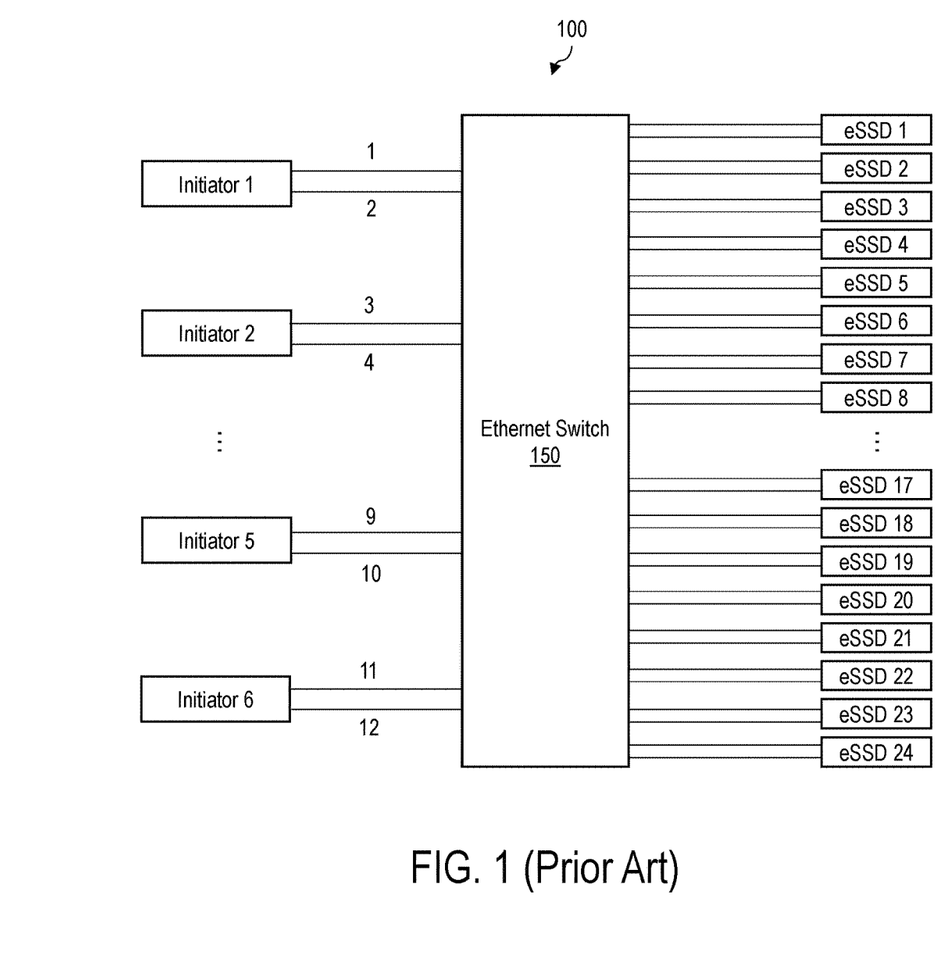
FIG. 1 shows a system block diagram of a prior art NVMeoF system.

FIG. 1 shows a system block diagram of a prior art NVMeoF system. The NVMeoF system 100 has an Ethernet switch 150 enclosed in a 2U chassis with 24 drive slots. A total of 24 eSSDs are attached to each of the 24 drive slots of the Ethernet switch 150. The eSSDs are herein also referred to as NVMeoF devices. For optimum performance, one initiator can connect to four eSSDs. In this case, 6 initiators are connected to the 24 eSSDs. For updating the firmware of the eSSDs attached to the Ethernet switch 150, 24 firmware upgrade commands need to be sent to each of the 24 eSSDs by the 6 initiators over a data plane of the Ethernet. The data transferred over the Ethernet on the data plane is not secure because of the vulnerability of the communication over the data plane on the Ethernet.

Figure 2:
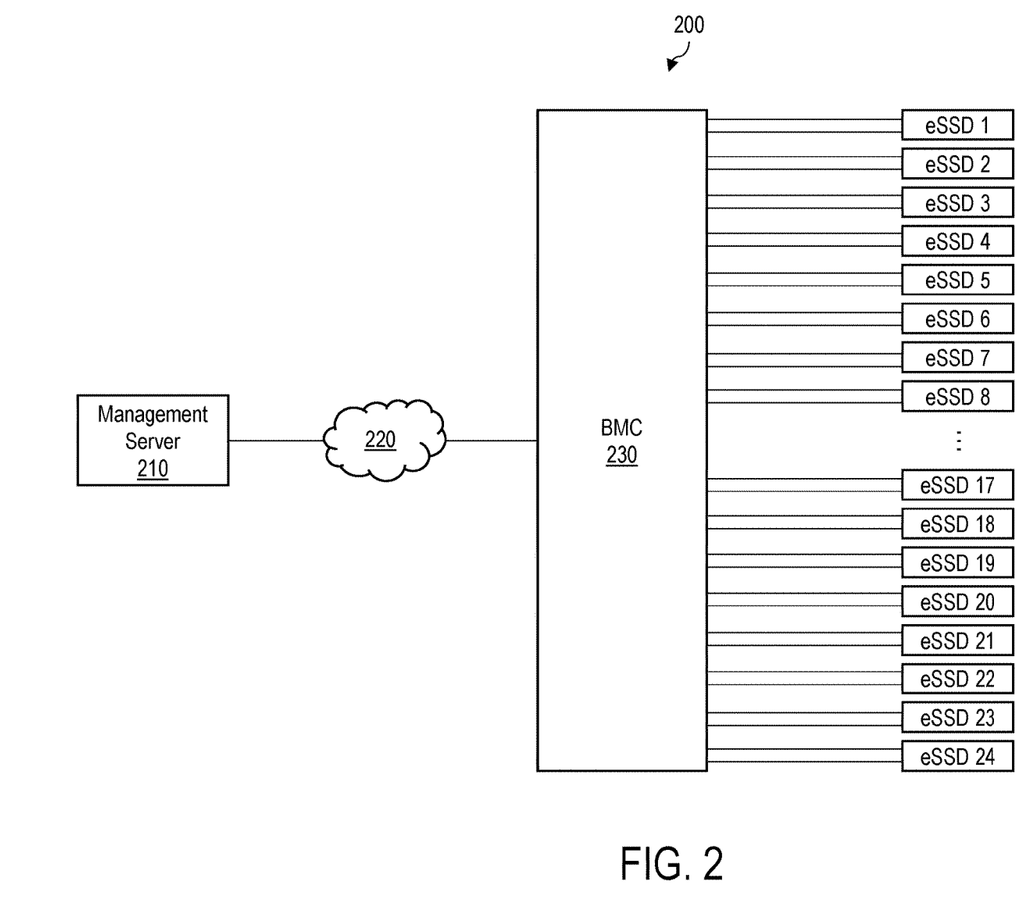
FIG. 2 shows a system block diagram of an example NVMeoF system, according to one embodiment.

FIG. 2 shows a system block diagram of an example NVMeoF system, according to one embodiment. The NVMeoF system 200 may also be referred to as a storage system, a server, or a switch. The NVMeoF system 200 has a baseboard management controller (BMC) 230 enclosed in a chassis. A total of 24 eSSDs are attached to the BMC 230 via respective connectors. A plurality of network nodes such as NVMeoF devices or eSSDs, and a management server 210 can pass data to each other through the fabric 220. Although the present example shows 24 eSSDs, it is appreciated that any number of eSSDs or any other type of NVMeoF devices can be attached to the NVMeoF system 200 without deviating from the scope of the present disclosure.

According to some embodiments, the fabric 220 is Ethernet. The BMC 230 is connected to a management network of the fabric 220. The BMC 230 is also connected to the eSSDs by a local bus such as a PCIe bus or an SMBus. The eSSDs are also connected to a data plane through an Ethernet switch. The detailed system block diagram including the connectors and other components of the NVMeoF system 200 will be discussed below with reference to FIGS. 3 and 4.

The management server 210 is connected to the NVMeoF system 200 via a fabric 220. The management server 210 can issue a single firmware update command to the NVMeoF system 200 over a control plane via the fabric 220. In response to the firmware update command from the management server 210, the BMC 230 can locally perform the firmware upgrade of the attached 24 eSSDs.

According to one embodiment, the firmware upgrade can be done with two priority levels, i.e., a high priority and a low priority. If the firmware upgrade request originated from a host is marked with a low priority, the BMC does not disrupt the current active workloads on the Ethernet ports and performs the firmware upgrade after completing the workloads on the Ethernet ports. If the firmware upgrade request originated from a host is marked with a high priority, the BMC performs the firmware upgrade ahead of any active workloads on the Ethernet ports. According to some embodiments, the firmware upgrade can be done with multiple priority levels equal to or higher than three levels. Depending on the priority of the firmware upgrade command, the BMC can complete some active workloads that are marked with a higher priority before performing the firmware upgrade ahead of the remaining active workloads that are marked with a lower priority.

Figure 3:
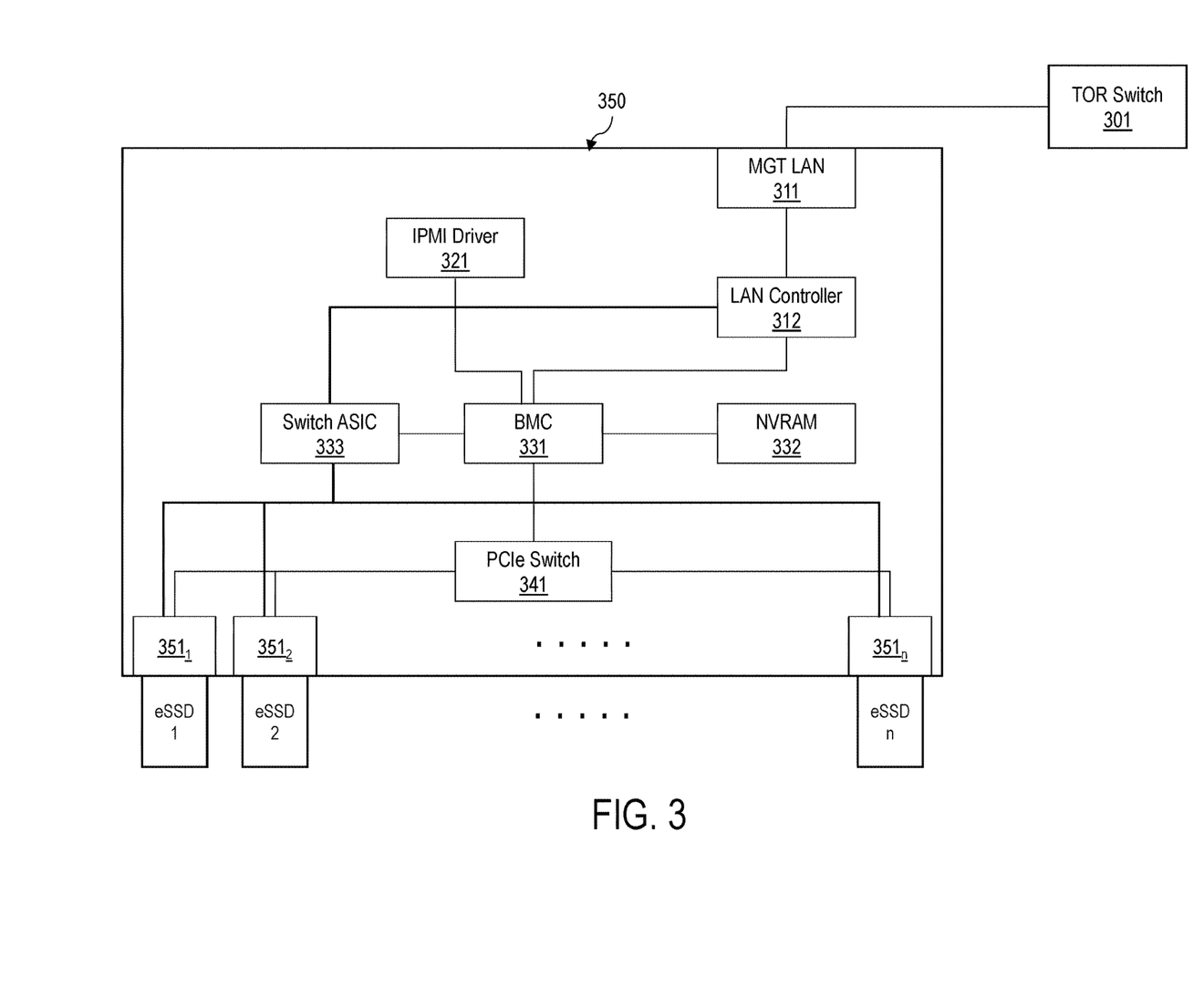
FIG. 3 shows a block diagram of an example switch board of an NVMeoF system, according to one embodiment.

FIG. 3 shows a block diagram of an example switch board of an NVMeoF system, according to one embodiment. The switch board 350 includes a management LAN 311 that is connected to an external top of rack (TOR) switch 301, a LAN controller 312, an IPMI driver 321, a BMC 331, a non-volatile memory 332 (e.g., flash memory), a switch application-specific integrated circuit (ASIC) 333, and a PCIe switch 341, and a plurality of slots 351 of a drive bay that is configured to accept a plurality of eSSDs. The LAN controller 312 may link a CPU (not shown) and the BMC 331 for a shared network interface controller (NIC) configuration. Alternatively, in a dedicated NIC configuration where the CPU connects to the Ethernet, the LAN controller 312 may not be necessary. Depending on its configuration, the NVMeoF system including the switch board 350 may also be referred to as a storage system, a server, or a switch.

An originating host (e.g., host software) can issue a firmware upgrade command to the BMC 331 via the TOR switch 301. The firmware upgrade command can include an IP address or a target NVMeoF device or a range or IP addresses of target NVMeoF devices (eSSDs), a firmware image, and an IP address of the management LAN 311. The IP address of the management LAN 311 represents an IP address of the switch board 350 to which the target NVMeoF devices (eSSDs) are connected. The management LAN 311 receives the firmware upgrade command and directs the firmware upgrade command to the BMC 331 via the LAN controller 312. The BMC 331 can send an IPMI command to commit the firmware upgrade corresponding to the firmware upgrade command originated by the host and performs the firmware upgrade of the target NVMeoF devices through the switch ASIC 333. The BMC 331 is also connected to the PCIe switch 341 for processing incoming workloads (e.g., read, write, and modify) directed to the attached NVMeoF devices on a data plane.

According to another embodiment, a firmware upgrade command may be established via a command line interface (CLI) of the IPMI driver 321. The firmware upgrade command can include an identification (ID) of a target NVMeoF device such as a serial number or an IP address of a target NVMeoF device or a range of IDs or IP addresses of target NVMeoF devices (eSSDs), and a firmware image. The IPMI driver 321 forwards the firmware upgrade command to the BMC 331, and the BMC 331 performs the firmware upgrade of the target NVMeoF devices through the switch ASIC 333.

The BMC 331 may establish or enable communication with the switch ASIC 333 for the firmware upgrade. In one embodiment, the connection between the BMC 331 and the switch ASIC 333 may be Ethernet. The Ethernet port established between the BMC 331 and the switch ASIC 333 can support 1 Gbps speed. The connection between the BMC 331 and the switch ASIC 333 is established only when needed, for example, in response to a firmware upgrade command. The Ethernet port may be disabled except for certain critical operations such as a firmware upgrade, to prevent malicious attacks over the data plane. Because the BMC 331 has an access to the switch ASIC 333 to which the target NVMeoF devices are attached, no PCIe switching is required for the firmware upgrade command, the BMC 331 can perform firmware upgrade using an IP address of the NVMeoF devices. In one embodiment, the BMW can send a single IPMI command for a device firmware upgrade to perform a firmware upgrade of a plurality of NVMeoF devices.

In response to the firmware upgrade request by the originating host, the BMC 331 copies the new firmware image into a locally accessible non-volatile memory 332. The BMC 331 may access the current version of the firmware for the attached NVMeoF devices stored in the non-volatile memory 332. If the current version of the firmware is older than the new one identified by the firmware upgrade command from the host, the BMC 331 downloads the firmware image to each of the selected NVMeoF devices through the local switch. The BMC can broadcast the firmware image to multiple devices via the switch ASIC 333. By default, the BMC 331 downloads the firmware image to all of the attached NVMeoF devices unless the firmware upgrade command explicitly specifies otherwise.

Each of the selected NVMeoF devices validates or authenticates the firmware image before updating the firmware. If an NVMeoF device determines that the new firmware is invalid, the NVMeoF device stops the process and reports back to the BMC 331 via the switch ASIC 333. If the NVMeoF device checks out that the firmware is valid, the NVMeoF device completes the firmware update and reports the status to the BMC 331 via the switch ASIC 333. The BMC 331 in turn reports the status back to the originating host via the LAN controller 312, the management LAN 311, and the TOR switch 301.

Figure 4:
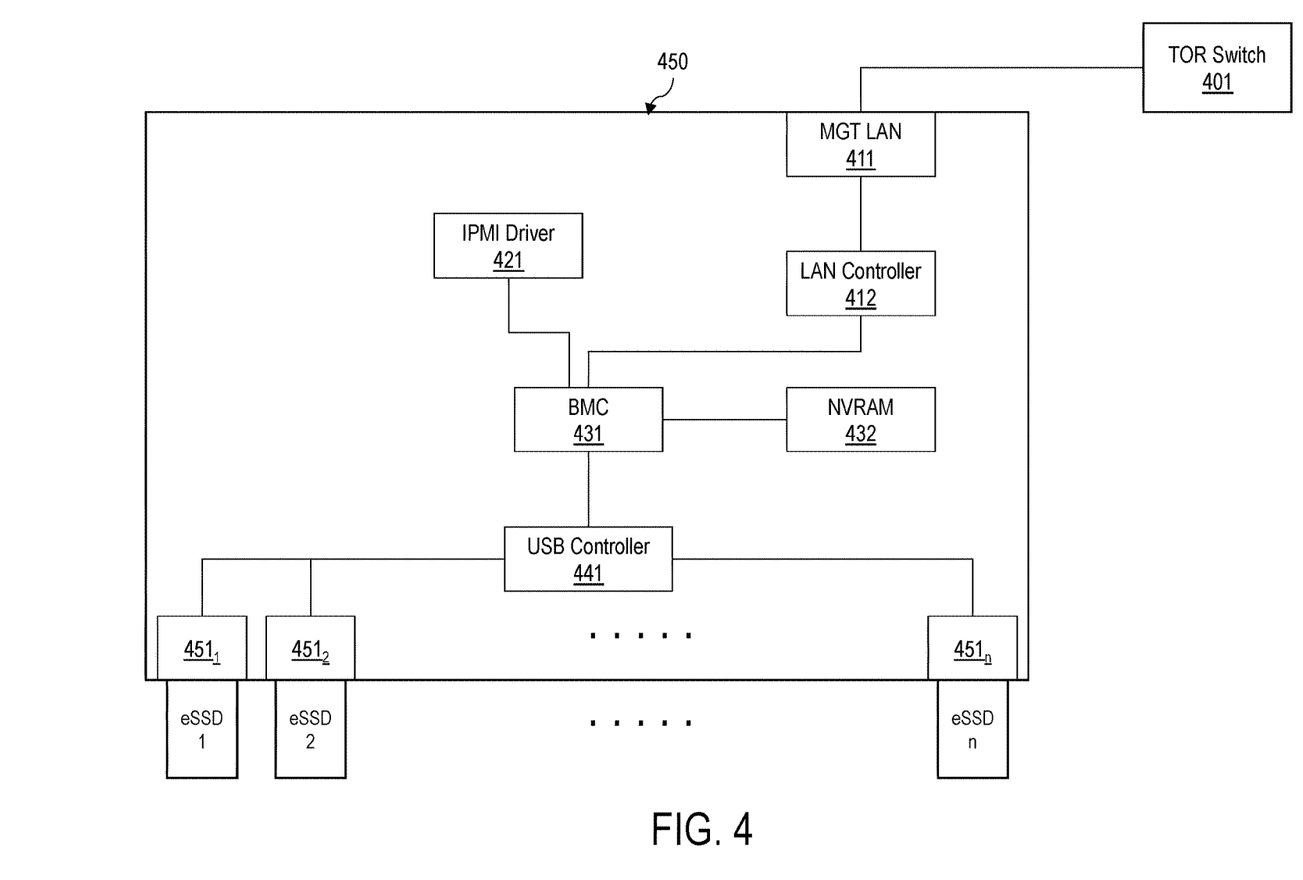
FIG. 4 shows a block diagram of an example switch board of an NVMeoF system, according to another embodiment.

FIG. 4 shows a block diagram of an example switch board of an NVMeoF system, according to another embodiment. The switch board 450 includes a management LAN 411 that is connected to an external top of rack (TOR) switch 401, a LAN controller 412, an IPMI driver 421, a BMC 431, a non-volatile memory 432 (e.g., flash memory), a USB controller 441, and a plurality of slots 451 of a drive bay that is configured to accept a plurality of eSSDs. Depending on its configuration, the NVMeoF system including the switch board 450 may also be referred to as a storage system, a server, or a switch.

An originating host (e.g., host software) can issue a firmware upgrade command to the BMC 431 via the TOR switch 401. The firmware upgrade command can include a firmware image and an IP address of the management LAN 411. The IP address of the management LAN 411 represents an IP address of the switch board 450 to which the target NVMeoF devices (eSSDs) are connected. The management LAN 411 receives firmware upgrade command and directs the firmware upgrade command to the BMC 431 via the LAN controller 412. The BMC 431 can send an IPMI command to commit the firmware upgrade corresponding to the firmware upgrade command originated by the host and performs the firmware upgrade of the target NVMeoF devices through the USB controller 441 over a private system bus. Because the USB bus allows the BMC 431 to access to the attached NVMeoF devices, neither PCIe switching nor an Ethernet port is required, and the BMC 431 can perform the firmware upgrade through the USB bus.

According to another embodiment, a firmware upgrade command may be established via a command line interface (CLI) of the IPMI driver 421. The firmware upgrade command can include an IP address or a target NVMeoF device or a range or IP addresses of target NVMeoF devices (eSSDs) and a firmware image. The IPMI driver 421 forwards the firmware upgrade command to the BMC 431, and the BMC 431 performs the firmware upgrade of the target NVMeoF devices through the USB bus.

In response to the firmware upgrade request by the originating host, the BMC 431 copies the new firmware image into a locally accessible non-volatile memory 432. The BMC 431 may access the current version of the firmware for the attached NVMeoF devices stored in the non-volatile memory 332. If the current version of the firmware is older than the new one identified by the firmware upgrade command from the host, the BMC 431 downloads the firmware image to each of the selected NVMeoF devices through the local switch. The BMC can broadcast the firmware image to multiple devices via the USB controller 441. By default, the BMC 431 downloads the firmware image to all of the attached NVMeoF devices unless the firmware upgrade command explicitly specifies otherwise.

Each of the selected NVMeoF devices validates or authenticates the firmware image before updating the firmware. If an NVMeoF device determines that the new firmware is invalid, the NVMeoF device stops the process and reports back to the BMC 431 via the USB controller 441. If the NVMeoF device checks out that the firmware is valid, the NVMeoF device completes the firmware update and reports the status to the BMC 431 via the USB controller 441. The BMC 431 in turn reports the status back to the originating host via the LAN controller 412, the management LAN 411, and the TOR switch 401.

Figure 5:
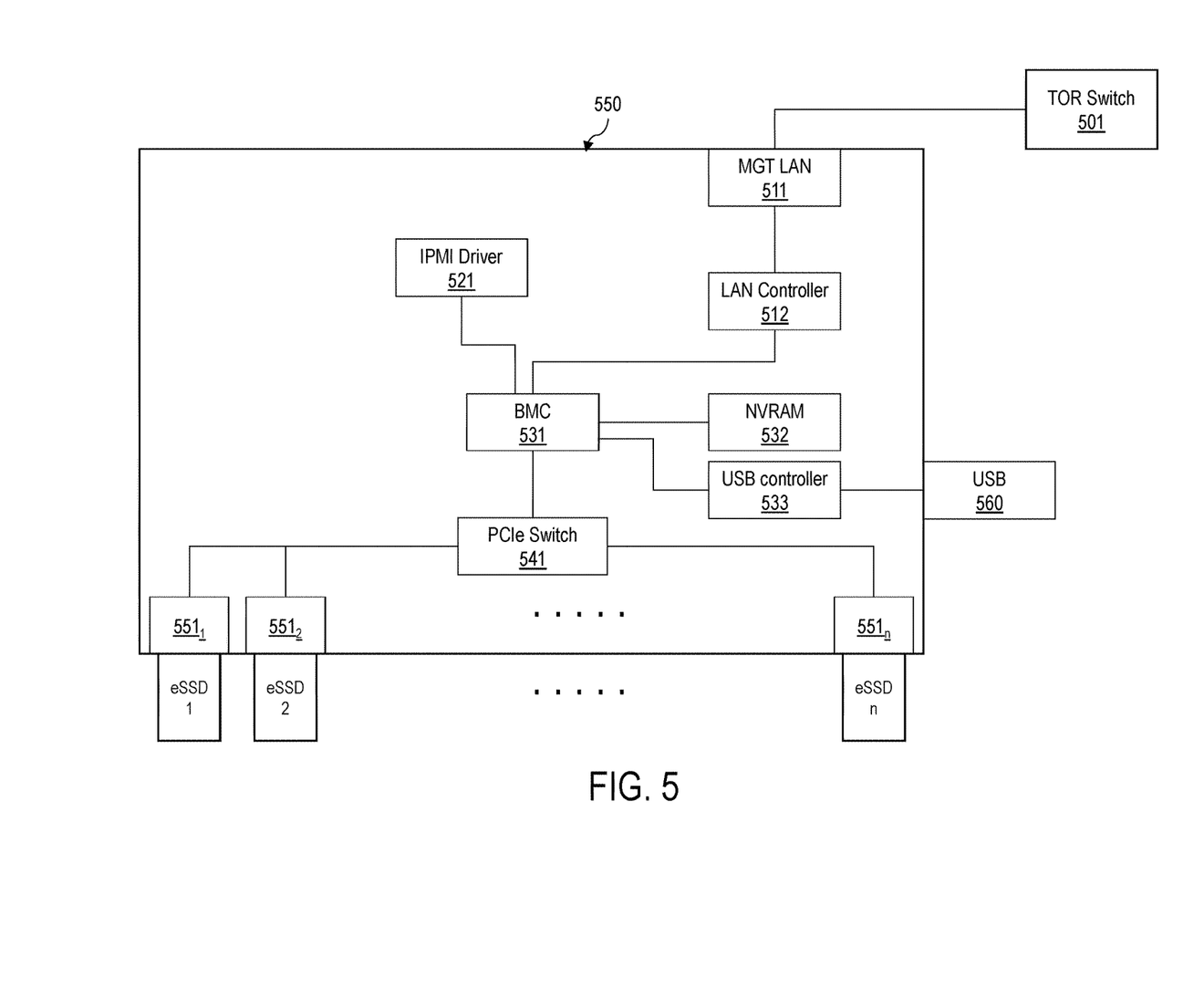
FIG. 5 shows a block diagram of an example switch board of an NVMeoF system, according to yet another embodiment.

FIG. 5 shows a block diagram of an example switch board of an NVMeoF system, according to yet another embodiment. The switch board 550 includes a management LAN 511 that is connected to an external top of rack (TOR) switch 501, a LAN controller 512, an IPMI driver 521, a BMC 531, a non-volatile memory 532 (e.g., flash memory), a PCIe switch 541, and a plurality of slots 551 of a drive bay that is configured to accept a plurality of eSSDs. Depending on its configuration, the NVMeoF system including the switch board 550 may also be referred to as a storage system, a server, or a switch.

An originating host (e.g., host software) can issue a firmware upgrade command to the BMC 531 via the TOR switch 501. The firmware upgrade command can include a firmware image and an IP address of the management LAN 511. The IP address of the management LAN 511 represents an IP address of the switch board 550 to which the target NVMeoF devices (eSSDs) are connected. The management LAN 511 receives firmware upgrade command and directs the firmware upgrade command to the BMC 531 via the LAN controller 512. The BMC 531 can send an IPMI command to commit the firmware upgrade corresponding to the firmware upgrade command originated by the host and performs the firmware upgrade of the target NVMeoF devices through the PCIe switch 541. The firmware upgrade of the target NVMeoF devices is performed via the control plane, for example, the PCIe switch 541. Because the data plane (e.g., Ethernet) bandwidth is not consumed, the firmware upgrade has no negative impact to the performance or the latency of the data plane.

According to another embodiment, the switch board 550 further includes a USB controller 533. A USB memory 560 including a new firmware for the NVMeoF devices is inserted into a USB slot of the USB controller 533. The BMC 531 can download the new firmware to the target NVMeoF devices via the PCIe switch 541. Although it is not shown, the switch board 350 of FIG. 3 and the switch board

450 of FIG. 4 can include a USB controller, and the BMC 331 and the BMC 431 can download the new firmware to the target NVMeoF devices via the Ethernet, the PCIe bus, or the USB controller 441. The firmware upgrade using a USB memory may be an alternative solution for a small volume application, but may not be a viable solution for enterprise or datacenters due to security concerns.

Figure 6:
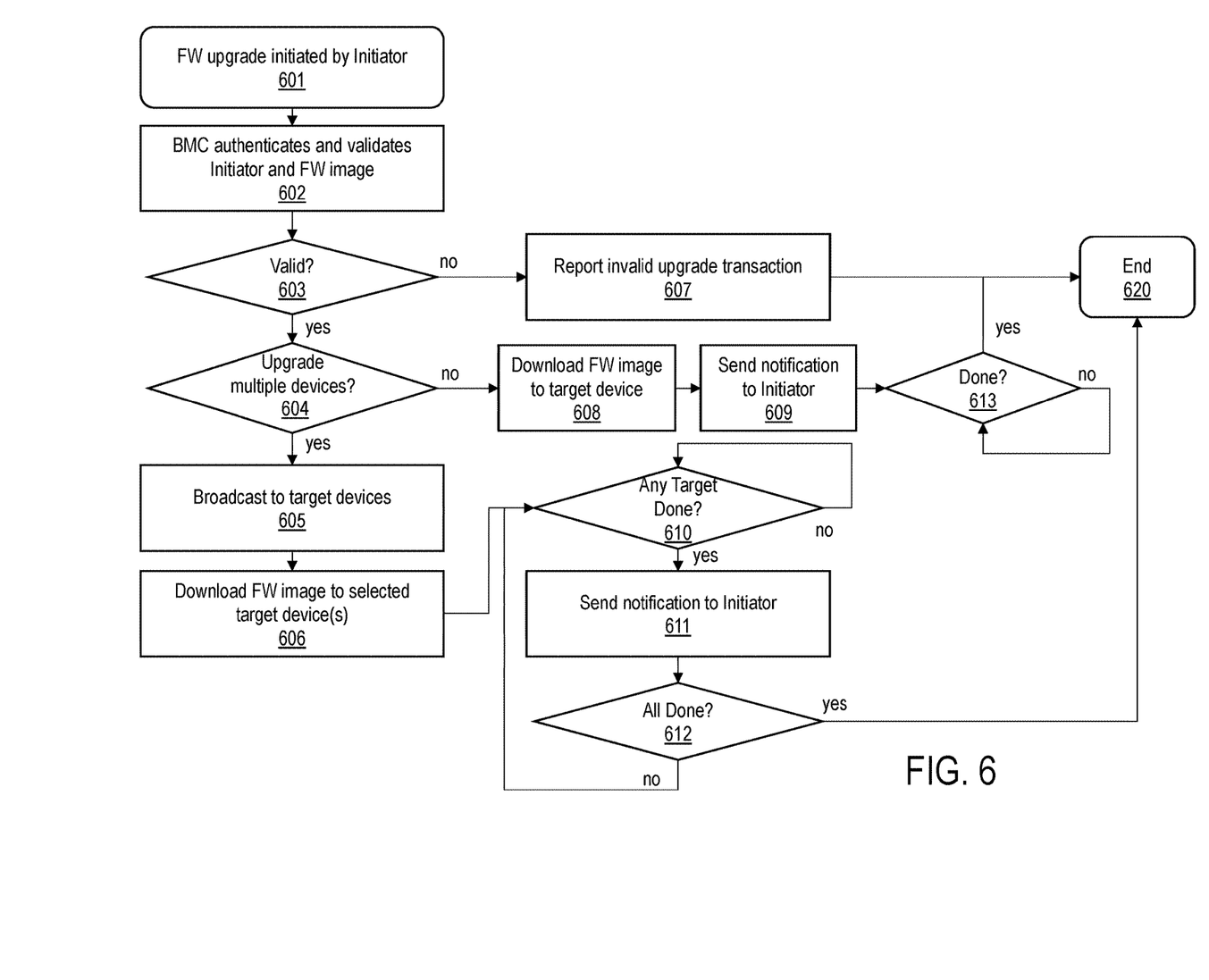
FIG. 6 shows a flow chart of an example firmware upgrade process, according to one embodiment.

FIG. 6 shows a flow chart of an example firmware upgrade process, according to one embodiment. A firmware upgrade request initiated by an initiator (e.g., a host computer) is received (601). A BMC receiving the firmware upgrade request authenticates and validates the initiator and the firmware image identified by the firmware upgrade request (602). If the initiator and the firmware image are valid (603), the BMC determines to send the firmware upgrade command to a target device or broadcast the firmware upgrade command to multiple devices (604). If the BMC determines that either the initiator or the firmware image is invalid (603), the BMC reports to the initiator that the requested firmware upgrade is failed (607) and complete the firmware upgrade transaction (620).

For a single device firmware upgrade, the BMC downloads the firmware image that is locally stored in a non-volatile memory to the target device (608) and sends a notification to the initiator (609). The BMC checks whether the firmware upgrade is completed at the target device (613) and completes the firmware upgrade transaction (620).

For multiple device firmware upgrade, the BMC broadcasts firmware upgrade commands to each of the target devices (605) and downloads the firmware image that is locally stored in the non-volatile memory to each the target devices (606). The BMC checks whether the firmware upgrade is completed at each of the target devices (610) and sends a notification to the initiator (611). After the firmware upgrade is done (612), the BMC completes the firmware upgrade transaction (620).

The present system and method allows the BMC of a server or a switch to perform a firmware upgrade of NVMeoF devices via a control plane. The BMC can authenticate and validate new firmware image before sending down to each the attached NVMeoF devices, hence the firmware upgrade process is more secure. This minimizes the involvement of the host initiator with the multiple target NVMeoF devices to upgrade the firmware, thus reduces the downtime of the system caused by the firmware upgrade.

According to one embodiment, the firmware image download can be performed as a background task without interrupting active transactions. The BMC can perform the background task for downloading the firmware image during a time when the NVMeoF devices are idling or the workloads are low. In comparison, a conventional method of firmware upgrade requires a target device to stop accepting new transactions until the firmware upgrade is completed. After the firmware image is downloaded to the target NVMeoF devices, the BMC can perform a subsequent firmware commit command to reset the target NVMeoF devices. The firmware commit command may interrupt the active transactions.

According to one embodiment, a method for upgrading a firmware of a target device includes: receiving a firmware upgrade request from an initiator, the firmware upgrade request including a target identification and a firmware image; authenticating the firmware upgrade request using a baseboard management controller (BMC) of a switching board; and performing the firmware upgrade of the target device using the BMC of the switching board.

The method may further include: downloading the firmware image to the target device; receiving a firmware commit command from the initiator; validating the firmware image; and performing a reset of the target device to activate the firmware upgrade.

The firmware commit command may be received via an IPMI driver.

The method may further include: storing the firmware image to a non-volatile memory of the switching board.

The method may further include reporting to the initiator after validating the firmware upgrade request or completing the firmware upgrade request.

The method may further include: sending the IPMI command to each of a plurality of target devices by the BMC; and performing the firmware upgrade of the plurality of target devices using the IPMI command.

The method may further include: broadcasting a single IPMI command to a plurality of target devices by the BMC; and performing the firmware upgrade of the plurality of target devices using the single IPMI command.

The method may further include: establishing an Ethernet connection between the BMC and a switch application-specific integrated circuit (ASIC) of the switching board in response to the firmware upgrade request from the initiator; and disabling the Ethernet connection between the BMC and the switch ASIC after performing the firmware upgrade.

The method may further include: performing the firmware upgrade of the target device via a universal serial bus (USB) established between the BMC and a USB controller of the switching board.

The method may further include: performing the firmware upgrade of the target device via a PCIe bus established between the BMC and the target device.

According to another embodiment, a switchboard includes: a plurality of slots configured to connect a plurality of devices; a network controller; and a baseboard management controller (BMC) connected to each of the plurality of slots. The BMC controller is configured to receive a firmware upgrade request from an initiator via the network controller, the firmware upgrade request including a target identification and a firmware image. The BMC is further configured to authenticate the firmware upgrade request and perform the firmware upgrade of one or more target devices.

The BMC may be further configured to download the firmware image to the one or more target devices; receive a firmware commit command from the initiator; validate the firmware image; and perform a reset of the one or more target devices to commit the firmware upgrade.

The firmware commit command may be received via an IPMI driver.

The switchboard may further include a non-volatile memory, wherein the BMC is further configured to store the firmware image to the non-volatile memory of the switching board.

The non-volatile memory may store one or more firmware images of the one or more target devices, compare a version of the firmware image included in the firmware upgrade request, and determine to perform the firmware upgrade of the one or more target devices based on the comparison.

The BMC may be further configured to report to the initiator after validating the firmware upgrade request or completing the firmware upgrade request.

The BMC may send the IPMI command to each of the one or more target devices by the BMC and perform the firmware upgrade of the one or more target devices using the IPMI command.

The BMC may broadcast a single IPMI command to of the one or more target devices and perform the firmware upgrade of the one or more target devices using the single IPMI command.

The switchboard may further include a switch application-specific integrated circuit (ASIC). An Ethernet connection may be established between the BMC and the switch ASIC in response to the firmware upgrade request from the initiator and may be disabled after performing the firmware upgrade.

The switchboard may further include a universal serial bus (USB) controller connected to the BMC and configured to perform the firmware upgrade of the target device via a USB bus.

The switchboard may further include a PCIe controller connected to the BMC and configured to perform the firmware upgrade of the one or more target devices via a PCIe bus.

The above example embodiments have been described hereinabove to illustrate various embodiments of implementing a system and method for upgrading a firmware of one or more target devices. Various modifications and departures from the disclosed example embodiments will occur to those having ordinary skill in the art. The subject matter that is intended to be within the scope of the invention is set forth in the following claims.

What is claimed is:

1. A method for upgrading a firmware of a non-volatile memory express over fabrics (NVMeoF) device comprising:
receiving a firmware upgrade request from an initiator, the firmware upgrade request including an identifier of the NVMeoF device and a firmware image;
authenticating the firmware upgrade request using a baseboard management controller (BMC) of a switching board before downloading the firmware image to the NVMeoF device; and
performing a firmware upgrade of the NVMeoF device using the BMC of the switching board,
wherein the NVMeoF device is removably attached to the switching board via a drive slot.

2. The method of claim 1, further comprising:
downloading the firmware image to the NVMeoF device;
receiving a firmware commit command from the initiator;
validating the firmware image; and
performing a reset of the NVMeoF device to activate the firmware upgrade.

3. The method of claim 2, wherein the firmware commit command is received via an IPMI driver.

4. The method of claim 1, further comprising:
storing the firmware image to a non-volatile memory of the switching board.

5. The method of claim 1, further comprising:
reporting to the initiator after validating the firmware upgrade request or completing the firmware upgrade request.

6. The method of claim 1, further comprising:
sending an IPMI command to each of a plurality of NVMeoF devices by the BMC; and
performing the firmware upgrade of the plurality of NVMeoF devices using the IPMI command.

7. The method of claim 1, further comprising:
broadcasting a single IPMI command to a plurality of NVMeoF devices by the BMC; and
performing the firmware upgrade of the plurality of NVMeoF devices using the single IPMI command.

8. The method of claim 1, further comprising:
establishing an Ethernet connection between the BMC and a switch application-specific integrated circuit (ASIC) of the switching board in response to the firmware upgrade request from the initiator; and
disabling the Ethernet connection between the BMC and the switch ASIC after performing the firmware upgrade.

9. The method of claim 1, further comprising:
performing the firmware upgrade of the NVMeoF device via a universal serial bus (USB) established between the BMC and a USB controller of the switching board.

10. The method of claim 1, further comprising:
performing the firmware upgrade of the NVMeoF device via a PCIe bus established between the BMC and the NVMeoF device.

11. A switchboard comprising:
a plurality of drive slots configured to removably connect a plurality of non-volatile memory express over fabrics (NVMeoF) devices;
a network controller; and
a baseboard management controller (BMC) connected to each of the plurality of drive slots,
wherein the BMC controller is configured to receive a firmware upgrade request from an initiator via the network controller, the firmware upgrade request including an identifier of one or more NVMeoF devices and a firmware image, and
wherein the BMC is further configured to authenticate the firmware upgrade request before downloading the firmware image to the one or more NVMeoF devices and perform a firmware upgrade of the one or more NVMeoF devices.

12. The switchboard of claim 11, wherein the BMC is further configured to download the firmware image to the one or more NVMeoF devices; receive a firmware commit command from the initiator; validate the firmware image; and perform a reset of the one or more NVMeoF devices to commit the firmware upgrade.

13. The switchboard of claim 12, wherein the firmware commit command is received via an IPMI driver.

14. The switchboard of claim 11, further comprising a non-volatile memory, wherein the BMC is further configured to store the firmware image to the non-volatile memory of the switching board.

15. The switchboard of claim 14, wherein the non-volatile memory stores one or more firmware images of the one or more NVMeoF devices, compares a version of the firmware image included in the firmware upgrade request, and determines to perform the firmware upgrade of the one or more NVMeoF devices based on the comparison.

16. The switchboard of claim 11, wherein the BMC is further configured to report to the initiator after validating the firmware upgrade request or completing the firmware upgrade request.

17. The switchboard of claim 11, wherein the BMC sends an IPMI command to each of the one or more NVMeoF devices by the BMC and performs the firmware upgrade of the one or more NVMeoF devices using the IPMI command.

18. The switchboard of claim 11, wherein the BMC broadcasts a single IPMI command to of the one or more NVMeoF devices by the BMC and performs the firmware upgrade of the of the one or more NVMeoF devices using the single IPMI command.

19. The switchboard of claim 11, further comprising a switch application-specific integrated circuit (ASIC), wherein an Ethernet connection is established between the BMC and the switch ASIC in response to the firmware upgrade request from the initiator and is disabled after performing the firmware upgrade.

20. The switchboard of claim 11, further comprising a universal serial bus (USB) controller connected to the BMC and configured to perform the firmware upgrade of the one or more NVMeoF devices via a USB bus.

21. The switchboard of claim 11, further comprising a PCIe controller connected to the BMC and configured to perform the firmware upgrade of the one or more NVMeoF devices via a PCIe bus.

* * * * *